Feb. 24, 1959 M. A. TOWNSEND 2,875,281

TELEPHONE RINGING SYSTEM

Filed March 8, 1954 4 Sheets-Sheet 1

INVENTOR
M. A. TOWNSEND
BY [signature]
ATTORNEY

Feb. 24, 1959 M. A. TOWNSEND 2,875,281

TELEPHONE RINGING SYSTEM

Filed March 8, 1954 4 Sheets-Sheet 2

INVENTOR
M. A. TOWNSEND
BY
[signature]
ATTORNEY

Feb. 24, 1959 M. A. TOWNSEND 2,875,281
TELEPHONE RINGING SYSTEM
Filed March 8, 1954 4 Sheets-Sheet 3

INVENTOR
M. A. TOWNSEND
BY
ATTORNEY

TELEPHONE RINGING SYSTEM

Filed March 8, 1954

4 Sheets-Sheet 4

INVENTOR
M. A. TOWNSEND
BY
ATTORNEY

United States Patent Office 2,875,281

Patented Feb. 24, 1959

2,875,281

TELEPHONE RINGING SYSTEM

Mark A. Townsend, Berkeley Heights, N. J., assignor to Bell Telephone Laboratories, Incorporated, New York, N. Y., a corporation of New York Application March 8, 1954, Serial No. 414,835

10 Claims. (Cl. 179—86)

This invention relates to systems for selectively operating one of a number of telephone ringers, all of which are connected to the same telephone line. The invention also relates to means for selectively operating one of two cold cathode tetrodes, the main electrodes of which are identically connected between the same two conductors.

Prior systems which utilize a single frequency current for both ringing and selection are exemplified in United States Patent 2,088,311 issued to L. J. Stacy. The Stacy patent discloses a four-party fully selective ringing system using a gas tube in series with each ringer. Selection is achieved by superimposed ringing, i. e., superimposing either a positive or a negative direct-current voltage on the alternating-current ringing voltage and by connecting the two gas tubes to each conductor such that they are oppositely poled. It will be seen, however, that this arrangement is intrinsically restricted to selection of one out of four ringers. This limitation obtains since there are only four possible combinations of one of two polarities of superimposed ringing voltage applied to one of the two line wires.

Consequently, if eight parties are connected to one line, four parties from each line to ground, and ringing signals are applied as disclosed in the Stacy patent, two ringers will operate affording only semiselective ringing.

There have been other methods disclosed in the prior art which by various expedients have been able to achieve fully selective operation of an eight-party ringing system. These methods include the voice frequency control selective ringing system and harmonic selective ringing system.

In an illustrative voice frequency control system, voice frequencies in the 400- to 600-cycle range are superimposed on the standard positive or negative battery voltages and 20-cycle ringing voltage. Each voice frequency operates a tuned reed selector at the desired selected station which closes a circuit to the ringer. United States Patent 2,532,125 issued to F. J. Singer and L. J. Stacy discloses such a system.

In harmonic selective ringing systems a plurality of frequencies are used to distinguish between ringers on the same line. Each ringer is designed to respond to a single frequency and is connected from a line wire to ground.

Both the voice frequency control and the harmonic systems, although completely operative, are subject to the objection that equipment for generating a multiplicity of carefully regulated frequencies and a comparable number of different types of equipment adapted to operate at the different frequencies are required. Other objections that can be raised to the use of harmonic ringing include the factor of large currents required to operate an harmonic selective ringing system and the necessity for higher voltages to ring at the higher frequency harmonics.

It is also apparent that both the harmonic and voice frequency systems are incapable of selecting only one ringer on an eight-party system by using the same single frequency current for both ringing and selection.

It is an object of this invention to achieve full selectivity in an eight-party ringing system by utilizing a single frequency current for ringing and the same single frequency current for selection with an economy of apparatus.

Another object of this invention is to achieve selective operation of only one of two cold cathode tubes, the main electrodes of which are identically connected between the same two conductors.

One illustrative embodiment of this invention comprises four ringers, each in series with the main gap of a principal gas tetrode, connected from each line conductor to ground. Two of the four ringers on each conductor require positive superimposed voltage to operate while the others require negative superimposed voltage. Thus far the new ringing system resembles the eight-party semiselective system above referred to, in the manner in which the ringers are connected. In accordance with a feature of the present invention, however, full selectivity is realized by controlling the starter gaps of the principal tetrode tubes. This control is achieved by utilizing an additional control diode at each station and by impressing a biasing voltage on the line conductor not being used for ringing. The control diodes are so connected that they will by-pass and prevent breakdown of the starter gaps in the principal tubes which are in series with the ringers that are not selected to operate. At the same time, as a result of the bias on the line conductor not used for ringing, the starter electrodes of the principal tube in series with the selected ringer will break down while its associated control diode will not. In this manner full selectivity is achieved.

The foregoing objects and features of this invention will be more readily understood, and additional objects will become apparent, from the following detailed description when read with reference to the attached drawings in which.

Figure 1:
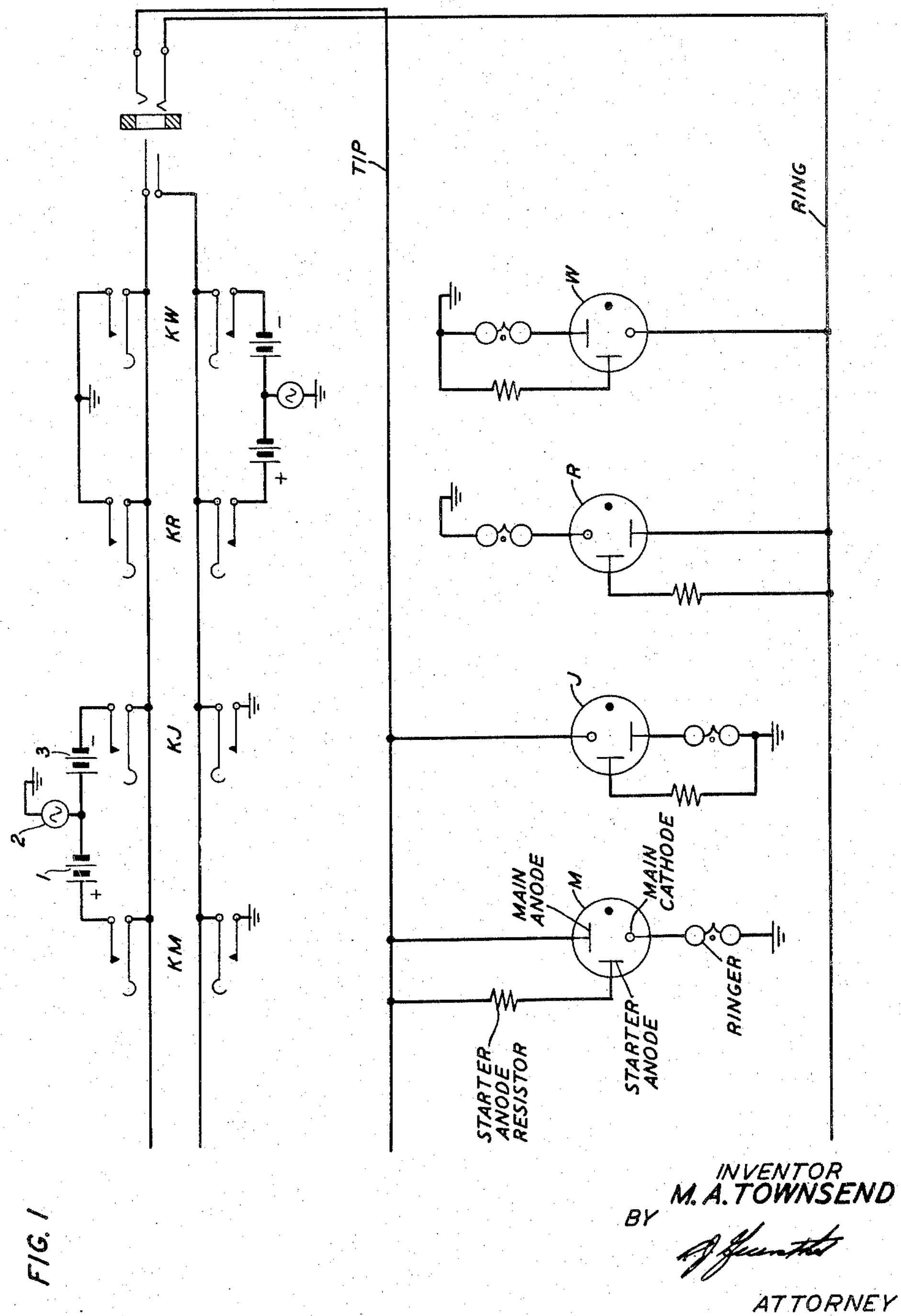
Fig. 1 illustrates a four-party selective ringing system indicative of the prior art.

In Fig. 1 a standard four-party selective ringing system similar to that disclosed in United States Patent No. 2,088,311 issued to L. J. Stacy is shown. It will be seen that the two gas tubes M and J, or R and W connected to each line wire are oppositely poled. The gas tubes shown may be considered as devices which conduct freely in the forward direction when the anode is made sufficiently positive with respect to the cathode, and are poor conductors in the reverse direction when the cathode is positive with respect to the anode. A typical tube of this kind is the Western Electric No. 426A.

When key K*m* in Fig. 1 is operated (assuming the cord to be plugged in the jack), alternating-current ringing voltage is applied to the tip conductor from ringing generator 2, this voltage being superimposed upon a positive direct-current voltage from battery 1. During the positive peaks, the applied voltage is large enough to cause the M tube to conduct in the forward direction and operate the ringer in series with it. The J tube does not operate since the positive peaks of the signal are of the wrong polarity and the negative peaks are too small to cause breakdown or appreciable current flow.

Operation of key K*j* in Fig. 1 applies a negative ringing signal, comprising a negative direct-current voltage from battery 3 superimposed upon the alternating-current voltage of ringing generator 2. Tube J will break down as a result of the large negative peaks of the signal and operate its ringer. Tube M does not operate as a result of the negative polarity of the signal. Stations R and W are rung by operating keys K*r* and K*w*, respectively.

Figure 2:
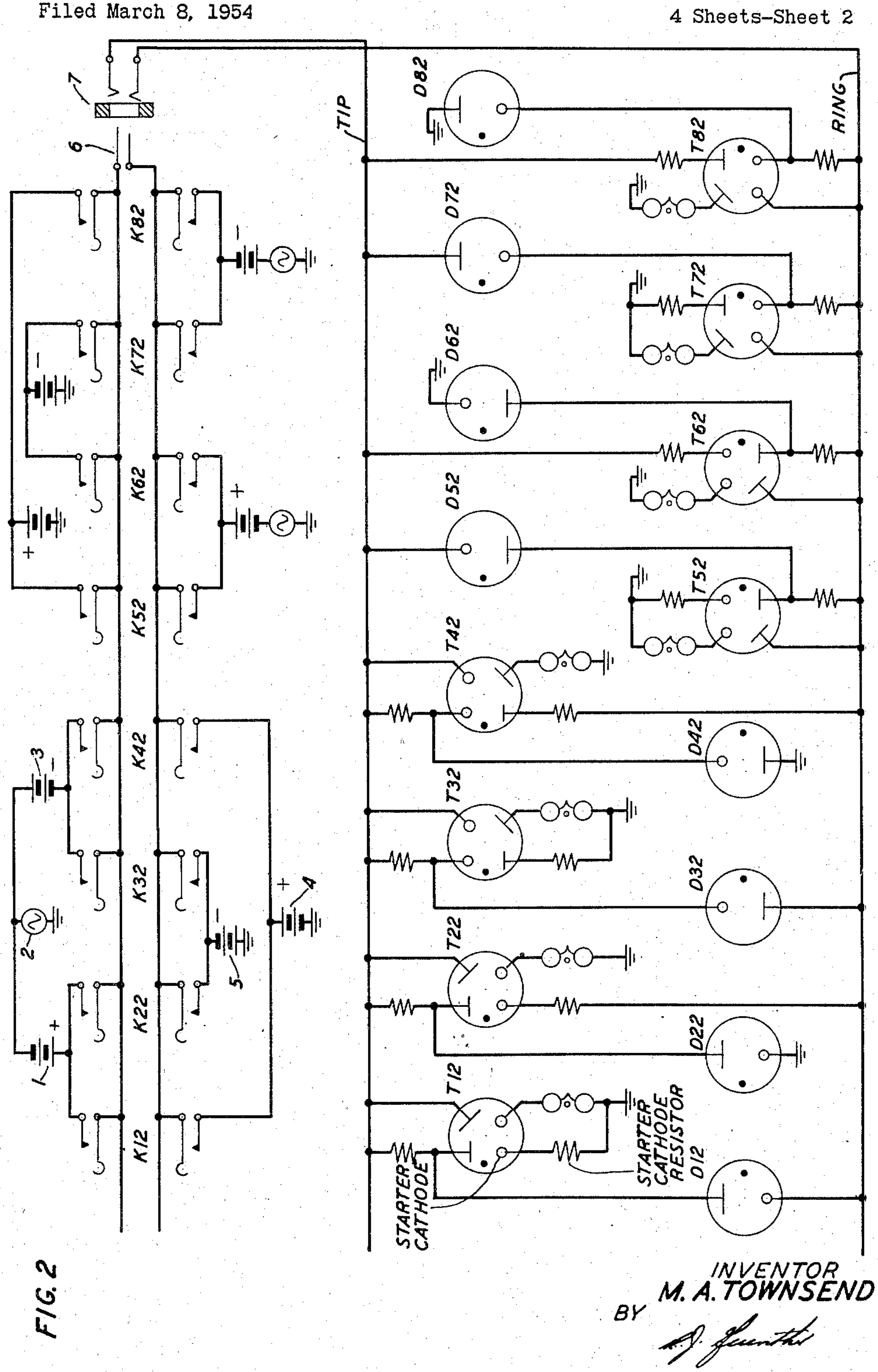
Fig. 2 shows an exemplary embodiment of applicant's invention using diodes to control breakdown of the starter gaps of the tetrodes.

An exemplary embodiment of the present invention is shown in Fig. 2. This embodiment constitutes a distinct improvement over the prior art system shown in Fig. 1 since full selectivity among eight parties is achieved.

In Fig. 2, the main gaps of the gas tetrodes T12 through T82 are connected in pairs such that tubes T12 and T22 require positive superimposed ringing voltage on the tip conductor to operate, tubes T32 and T42 require negative superimposed ringing voltage on the tip, tubes T52 and T62 require positive superimposed ringing voltage on the ring conductor and tubes T72 and T82 require negative superimposed ringing voltage on the ring conductor. The several tubes may be, for example, the Western Electric No. 425A. Full selectivity is realized by controlling the starter gaps of the gas tetrodes. This control is achieved by utilizing an additional diode at each station and by applying a bias to the line conductor not being used for ringing.

Each tetrode in Fig. 2 has a ringer connected in series with its main electrodes and a ground connection. Each control diode D12 through D82 in Fig. 2 is connected between a starter electrode of a principal tetrode and a line conductor or a ground connection.

In order to ring the subscriber whose bell is in series with tetrode T12, for example, the operator will insert the plug 6 of Fig. 2 into the jack 7 and operate key K12.

When key K12 is operated, positive ringing voltage is applied to the tip conductor from generator 2 and battery 1 and the ring conductor is biased positively with respect to ground by battery 4. In this situation the positive bias on the ring conductor places diode D12 at a disadvantage as compared to the starter gap of tube T12. The voltage across the starter gap of tube T12 is equal to the sum of the voltages of battery 1 and generator 2. The voltage across diode D12 is less than the voltage across the starter gap by an amount equal to the voltage of battery 4. Thus, if the starter gap of tube T12 has approximately the same breakdown voltage as diode D12, the starter gap will break down first and the main gap of tube T12 will conduct and the ringer in series with tube T12 will operate. Under these conditions the positive bias on the ring conductor favors the diode D22 over the starter gap of tube T22. This will result in the breakdown of diode D22. When diode D22 breaks down current flowing in the starter anode resistor of tube T22 will prevent breakdown of the starter gap of tube T22 and the ringer in series with tube T22 will not operate. The positive superimposed ringing voltage is of the wrong polarity to operate tubes T32 and T42 and no ringing signal is applied to tubes T52, T62, T72 and T82, except through the high impedances in their starter gaps. Consequently when key K12 is operated and positive superimposed ringing voltage is applied to the tip conductor and a positive bias is applied to the ring conductor, the ringer in series with tube T12 will alone operate.

When key K22 is operated positive superimposed voltage is applied to the tip conductor, but in this case a negative bias is applied to the ring conductor. Consequently diode D12 is favored over the starter gap of tube T12 and firing or breakdown of tube T12 is prevented. At the same time, the starter gap of tube T22 is favored over diode D22, and this permits the main gap of tube T22 to break down, operating the ringer in series with it. Tubes T32 and T42 do not operate under these conditions as they require a different polarity of ringing, and tubes T52, T62, T72 and T82 have no ringing signal applied except through the high impedances in their starter gaps. Consequently when key K22 is operated the ringer in series with tube T22, and only that ringer, will operate.

Operation of keys K32 and K42 results in the application of negative superimposed ringing voltage on the tip conductor. Key K32 will operate only the ringer in series with tube T32 since the negative bias applied to the ring conductor favors the breakdown of the starter gap of tube T32 over the breakdown of diode D32 and at the same time favors diode D42 over the starter gap of tube T42, thereby blocking the breakdown of tube T42. Operation of key K42 applies a positive bias to the ring conductor favoring the starter gap of tube T42 over diode D42 causing the ringer in series with tube T42 to operate. When key K42 is operated, the positive bias on the ring conductor favors diode D32 blocking the firing of the starter gap of tube T32. The ringers in series with tubes T12 and T22 do not operate when Key K32 or K42 is operated because the superimposed ringing voltage is of the wrong polarity. As before, the ringers in series with tubes T52, T62, T72 and T82 do not operate since ringing voltage is applied only through the high impedances of their starter gaps.

The above explanation of the operation of keys K12, K22, K32 and K42 may be augmented to explain the operation of keys K52, K62, K72 and K82 and the fact that the ringers in series with tubes T52, T62, T72 and T82 are operated when the corresponding keys are operated. It will be seen that the connections to the tip and ring conductors have been interchanged both in the tube circuits and in the key circuits. Consequently, key K52 applies positive superimposed ringing voltage to the ring conductor and tube T52 fires because the positive bias on the tip conductor favors the starter gap of tube T52 over diode D52. Since the above principles of operation may be applied equally to the explanation of the operation of keys K62 through K82, a comprehensive discussion of their operation is not thought necessary.

Figure 3:
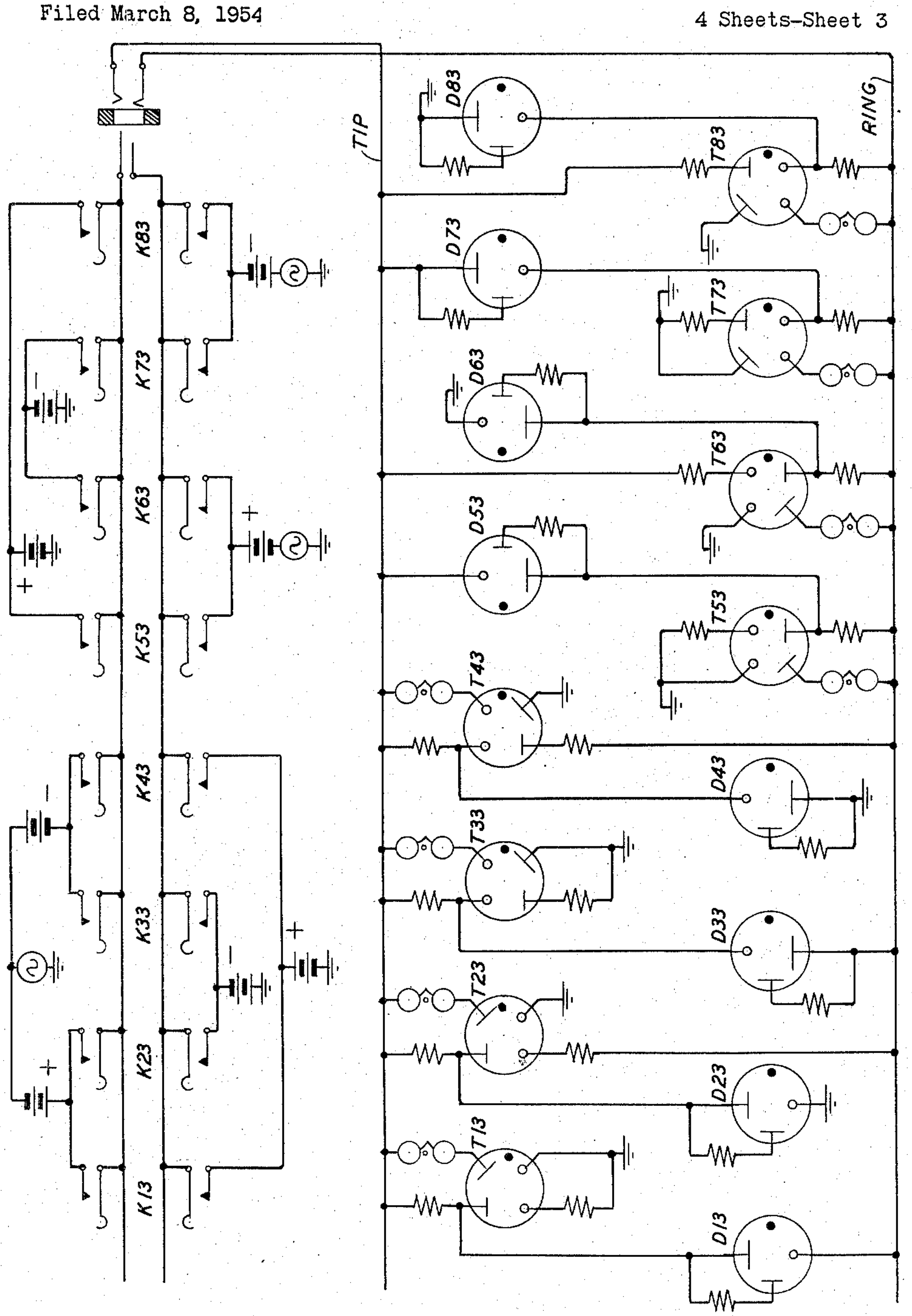
Fig. 3 shows another embodiment of the invention using triodes connected as diodes in lieu of the diodes of Fig. 2.

In the embodiment illustrated in Fig. 3, cold cathode triodes D13 through D83 are used instead of the diodes D12 through D82 of Fig. 2. The directional characteristics of the triodes limit and reduce the reverse currents that flow when reverse voltages are applied. Also in Fig. 3 the ringers are connected to the line conductors instead of ground. This manner of connection guards against the possibility that high peak voltages produced during the ringing signal might break down one of the diodes in series with one of the starter electrodes of the tetrode. For example, when key K22 is operated in Fig. 2 the peak signal on the anode of tube T22 may be 180 volts. If breakdown should occur from the main anode to the starter anode of tube T22 a path would exist to ground through diode D22 which would by-pass some of the ringing signal. In the circuit of Fig. 3, this will not occur because the voltage drop across the ringer would allow less than a hundred volts for the gap between the main anode and starter anode of tube T22 and diode D22 in series.

Figure 4:
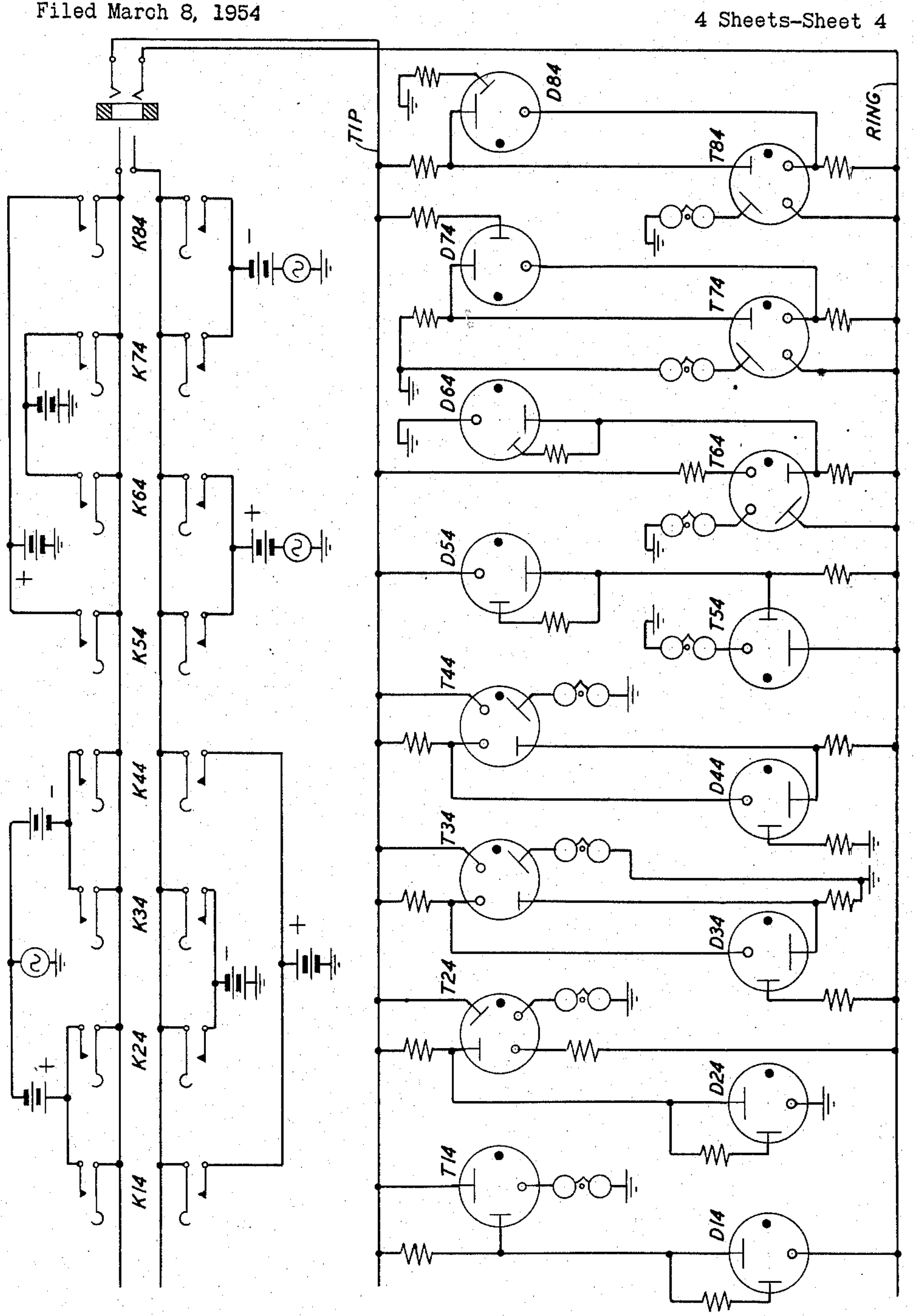
Fig. 4 shows another embodiment of the invention using triodes in lieu of the diodes of Fig. 2.

In Fig. 4 another circuit arrangement embodying the invention is presented. In Fig. 4 the manner of connecting the triodes D34, D44, D74 and D84 differs from the connections in the previous figures. It may be seen that these triodes have their starter gaps connected as in Fig. 3 but the main gaps of the triodes are connected directly in parallel with the starter gaps of the corresponding tetrodes. This type of connection has the desirable feature of reducing the current required to block operof the tetrodes.

In the circuit of Fig. 2, blocking diodes D32, D42, D72 and D82 each have a current limiting resistance of the order of 20,000 ohms in series. In the same circuit, the diodes D12, D22, D52 and D62 each have current limiting resistors of the order of 100,000 ohms. The reason for this is that the resistance in series with the starter cathode of a tetrode is necessarily low compared to the resistance in series with the starter anode. Consequently, the circuit arrangement disclosed in Fig. 4 permits high resistance control of all tubes since a starter anode resistance is always in series with the main gap of the blocking diode.

Another modification shown in Fig. 4 is the replacement of the tetrodes in the T14 and T54 positions with triodes. This may be done since no control function is served by the starter cathodes in these two positions.

It will be seen that the above facts and embodiments, in addition to disclosing means for and methods of operating one out of eight ringers connected to the same telephone line, also disclose means for and methods of achieving selective operation of only one of two cold cathode tubes, the main or working gaps of which are connected to the same two conductors.

It is to be understood that though the embodiments shown incorporate the use of cold cathode gas diodes, silicon (Zener) diodes may be used instead. Such substitution is disclosed in an application of R. J. Kircher, Serial No. 365,080 filed June 30, 1953. Fig. 5 of the Kircher application discloses a four-party selective ringing circuit employing a Zener diode connected in series opposition with a conventional high back resistance diode, in lieu of a gas diode.

It is further to be understood that the circuits shown are exemplary and that other combinations will be apparent to those skilled in the art and will not depart from the scope of this invention.

What is claimed is:

1. In a selective signaling system, in combination, a line having tip and ring conductors, a source of direct-current bias voltage, a source of positive alternating-current signaling voltage, a source of negative alternating-current signaling voltage, said signaling voltages being of equal magnitude, a plurality of stations, each of said stations comprising a ringer, a multielectrode gas discharge device connected to said ringer, unidirectional shunting control means, means connecting said unidirectional control means to one of said electrodes of said multielectrode device and means connecting said multielectrode device to said line, whereby the conduction of current by said shunting control means prevents breakdown of said gas discharge device, and means for energizing a selected ringer including means for selectively connecting said alternating-current signaling voltages and said direct-current bias voltage to said line in a plurality of combinations to produce different voltage signals for each of said stations, thereby to provide selective shunting of said discharge devices connected to non-selected ringers.

2. In a selective signaling system in accordance with claim 1, wherein said multielectrode gas discharge device includes a first multielectrode gas discharge tube and said unidirectional shunting control means includes a second multielectrode gas discharge tube, and wherein said means connecting said unidirectional means to said multielectrode device and said means connecting said multielectrode device to said line include a ground connection; means connecting the main electrodes of said first tube from the one of said conductors carrying the signal voltage serially through said ringer to ground; additional connecting means at each station extending from said conductor carrying the signal voltage serially through impedance means to a first starter electrode in said first tube and to a main electrode of said second tube; means at certain of said stations connecting a second starter electrode of said first tube serially through impedance means to ground and additional means connecting another main electrode of said second tube to said conductor carrying the direct-current bias voltage; means at others of said stations connecting the second starter electrode of said first tube serially through impedance means to said conductor carrying the direct-current bias voltage and means connecting the other main electrode of said second tube to ground.

3. In a selective signaling system in accordance with claim 2 wherein each of said second tubes includes a main anode, a main cathode, a starter anode, and means connecting said main anode through impedance means to said starter anode.

4. In a selective signaling system in accordance with claim 1 wherein said stations comprise a first and second group, and said multielectrode gas discharge device includes a first multielectrode gas discharge tube and said unidirectional shunting control means includes a second multielectrode gas discharge tube, and wherein said means connecting said unidirectional means to said multielectrode device and said means connecting said multielectrode device to said line include a ground connection; means connecting the main electrodes of said first tube from the one of said conductors carrying the signal voltage serially through said ringer to ground; additional connecting means at each station extending from said conductor carrying the signal voltage serially through impedance means to a first stater electrode in said first tube and to a first main electrode of said second tube; means in said first group of said stations connecting the main electrodes of said second tube in parallel with the starter electrodes of said first tube, means in one-half of said first group of stations connecting a second starter electrode in said first tube serially through impedance means to ground and connecting a starter electrode in said second tube serially through impedance means to said conductor carrying the direct-current bias voltage and means in the remaining one-half of said first group of stations connecting a second starter electrode in said first tube serially through impedance means to said conductor carrying the direct-current bias voltage and connecting a starter electrode in said second tube serially through impedance means to ground; means in one-half of said second group of said stations connecting a second starter electrode of said first tube serially through impedance means to said conductor carrying the direct-current bias voltage and connecting a second main electrode of said second tube to ground and means in the remaining one-half of said second group of stations connecting a second main electrode of said second tube to said conductor carrying the direct-current bias voltage; and means in each station of said second group connecting a starter electrode of said second tube to the main anode of said second tube.

5. In a multiparty selective telephone ringing system, a line having tip and ring conductors; a source of polarized pulsating current; a source of direct current; means for applying said pulsating current and said direct current to said conductors in different combinations, a plurality of stations connected to said line, each of said stations comprising a ringer, a ground connection, a principal gas discharge tube and a control gas discharge tube, means for connecting a first main electrode of said control tube to a first starter electrode of said principal tube, and connecting means extending from said first starter electrode to said conductor carrying the pulsating current; means at certain of said stations connecting a second starter electrode of said principal tube to ground and a second main electrode of said control tube to said conductor carrying said direct current, means at others of said stations connecting a second starter electrode of said principal tube to said direct-current source and connecting a second main electrode of said control tube to ground, whereby the firing of said control tube will prevent the breakdown of the main gap of said principal tube; additional connecting means at each of said stations extending serially from said conductor carrying the pulsating current through said principal tube and said ringer to ground, wherein the operation of said means for connecting said pulsating current source and said direct-current source to said line conductors in a particular combination energizes a selected one of said ringers; a first and second station of said plurality of stations comprising connecting means extending from said tip conductor to a main anode of said principal tube and from a main cathode of said tube serially through said ringer to ground, connecting means extending from said tip conductor serially through impedance means to a starter anode of said principal tube and from a main anode of said control tube to said starter anode of said principal tube; connecting means in said first station extending from a main cathode of said control tube to said ring conductor and from a starter cathode of said principal tube serially through impedance means to ground; and connecting means in said second station extending from a main cathode of said control tube to ground and from a starter cathode of said principal tube serially through impedance means to said ring conductor.

6. A system according to claim 5 wherein a third and fourth station of said plurality of stations comprise connecting means extending from said tip conductor to a main cathode of said principal gas tube and from a main anode of said principal tube serially through said ringer to ground, connecting means extending from said tip conductor serially through impedance means to a starter cathode of said principal tube and from a main cathode of said control gas tube to said starter cathode of said principal tube; connecting means in said third station extending from a main anode of said control tube to said ring conductor and from a starter anode of said principal tube serially through impedance means to ground; and connecting means in said fourth station extending from a main anode of said control tube to ground and from a starter anode of said principal tube serially through impedance means to said ring conductor.

7. A system according to claim 6, wherein a fifth and sixth station of said plurality of stations comprise connecting means extending from said ring conductor to a main anode of said principal gas tube and from a main cathode of said tube serially through said ringer to ground, connecting means extending from said ring conductor serially through impedance means to a starter anode of said principal tube and from a main anode of said control tube to said starter anode of said principal tube; connecting means in said fifth station extending from a main cathode of said control tube to said tip conductor and from a starter cathode of said principal tube serially through impedance means to ground; and connecting means in a sixth of said stations extending from a main cathode of said control tube to ground and from a starter cathode of said principal tube serially through impedance means to said tip conductor.

8. A system according to claim 7 wherein a seventh and eighth of said plurality of stations comprise connecting means extending from said ring conductor to a main cathode of said principal tube and from a main anode of said tube serially through said ringer to ground, connecting means extending from said ring conductor serially through impedance means to a starter cathode of said principal tube and from a main cathode of said control tube to said starter cathode of said principal tube; connecting means in a seventh of said stations extending from a main anode of said control tube to said tip conductor and from a starter anode of said principal tube serially through impedance means to ground; and connecting means in an eighth of said stations extending from a main anode of said control tube to ground and from a starter anode of said principal tube serially through impedance means to said tip conductor.

9. In combination, a line having a first and second conductor, a source of alternating current, a source of direct current, means for appplying said alternating-current source and said direct-current source to said line conductors in different combinations, a first gas tetrode and a second gas tetrode each including two main electrodes and two starter electrodes, a first unidirectional multielectrode control device and a second unidirectional multielectrode control device, means connecting a first main electrode and a first starter electrode of the same polarity in each of said tetrodes to said first conductor, impedance means serially connected between each of said first starter electrodes and said first conductor, means connecting a second main electrode of each of said tetrodes serially through an external load device to ground, means connecting said first starter electrodes in each of said tetrodes to a main electrode in each of said control devices, means connecting another main electrode in said first control device to said second conductor, means connecting another main electrode in said second control device to ground, means connecting a second starter electrode in said first tetrode through impedance means to ground and means connecting a second starter electrode in said second tetrode through impedance means to said second conductor whereby application of a predetermined combination of said alternating-current and said direct-current voltages to said conductors will result in the firing of only one of said tetrodes thereby energizing its associated load device.

10. The combination, according to claim 9 wherein said control devices comprise multielectrode gas discharge devices.

References Cited in the file of this patent

UNITED STATES PATENTS

| | | |
|---|---|---|
| 1,795,389 | Edwards | Mar. 10, 1931 |
| 2,004,244 | Holden | June 11, 1935 |
| 2,088,311 | Stacy | July 27, 1937 |
| 2,261,620 | Halligan | Nov. 4, 1941 |
| 2,268,880 | Kusche | Jan. 6, 1942 |
| 2,408,299 | Davis | Sept. 24, 1946 |

FOREIGN PATENTS

| | | |
|---|---|---|
| 749,998 | Great Britain | June 6, 1956 |